United States Patent [19]
Takada et al.

[11] Patent Number: 6,089,577
[45] Date of Patent: Jul. 18, 2000

[54] TWO DRIVE-SYSTEM FLUID PRESSURE CHUCK

[75] Inventors: Susumu Takada; Hiroshi Miyachi; Koichiro Kanda; Koji Hara, all of Ibaraki, Japan

[73] Assignee: SMC Corporation, Tokyo, Japan

[21] Appl. No.: 09/152,790

[22] Filed: Sep. 14, 1998

[30] Foreign Application Priority Data

Oct. 3, 1997 [JP] Japan ..................................... 9-287796

[51] Int. Cl.[7] .......................... B23B 31/177; B23B 31/30
[52] U.S. Cl. ......................................... 279/4.12; 279/121
[58] Field of Search .................................... 279/4.12, 121

[56] References Cited

U.S. PATENT DOCUMENTS 2,704,214  3/1955  Beausoleil ................................ 279/121
5,762,391  6/1998  Sumnitsch ............................. 294/119.1

FOREIGN PATENT DOCUMENTS 16905     1/1988  Japan ...................................... 279/121
2 283 189 5/1995  United Kingdom .

Primary Examiner—Steven C. Bishop
Attorney, Agent, or Firm—Oblon, Spivak, McClelland, Maier & Neustadt, P.C.

[57] ABSTRACT

A two-drive-system fluid pressure chuck including two sets of jaw members capable of chucking a workpiece from two directions X and Y. The chuck includes two cylinder apparatuses, a first rod, a second rod, and a cam member. The first rod being slidably disposed within the inside of the second rod. The cam member is formed at the tip of each rod and is used to convert the reciprocal operation of each rod into the opening and closing operations of the jaw members. A notch is formed in the side of the second rod, and the cam member of the first rod protrudes out from the second rod through this notch to connect to the jaw member.

4 Claims, 3 Drawing Sheets

TWO DRIVE-SYSTEM FLUID PRESSURE CHUCK

FIELD OF THE INVENTION

The present invention relates to a two-drive-system fluid pressure chuck having two sets of jaw members that are individually opened and closed by two sets of cylinder apparatuses and using these jaw members to chuck a work from two orthogonal directions.

PRIOR ART

If a workpiece is chucked from two directions X and Y by a fluid pressure chuck including two sets of closable jaw members, and if the length of the workpiece in direction X is the same as that in direction Y, as in a circle or a square, then the workpiece can be simply chucked even if a single drive system is used to open and close the two sets of jaws.

If, however, the length of the workpiece in direction X is different from that in direction Y, as in an ellipse or a rectangle, the workpiece cannot be chucked using a type of a chuck that drives the two sets of jaw members using a single drive system.

Thus, such an elliptical or a rectangular workpiece requires a two-drive-system chuck that individually drives the two sets of jaw members using two drive mechanisms.

FIGS. 4 and 5 show a proposed two-drive-system fluid pressure chuck. The fluid pressure chuck 1 comprises a first body member 2, a second body member 3, a third body member 4, and a jaw guide 5, each having a cylinder hole inside. These members are integrally assembled together using connection bolts.

A first cylinder apparatus 7 formed on the first body member 2 has a first piston 7a, and a second fluid pressure cylinder 8 formed in the second body member 3 has a second piston 8a. A first rod 9 attached to the first piston 7a penetrates, in an airtight manner, the centers of the second piston 8a and rod 10 that are concentric with the first rod 9, and protrudes into the jaw guide. The second rod 10, which is hollow and cylindrical, penetrates a central hole in the third body member 4 in an airtight manner.

In addition, the first body member 2 has ports 11a and 11b for supplying and ejecting compressed air to and from a pair of pressure chambers partitioned by the first piston 7a, while the second body member 3 has ports 12a and 12b for supplying and ejecting compressed air to and from a pair of pressure chambers partitioned by the second piston 8a.

First locking recessed grooves 9a are provided in the outer circumferential surface of the first rod 9 in its part that protrudes from the second rod 10, and second locking recessed grooves 10a are provided in the outer circumferential surface of the second rod 10 near its tip.

In addition, the third body member 4 has notched grooves 14, 14 in its surface positioned opposite the first locking recessed groove 9a, and has slits 15, 15 in its surface positioned opposite the second locking recessed groove 10a. First pins 14a, 14a are provided in the notched grooves 14, 14, while second pins 15a, 15a are provided in the slits 15, 15.

First jaw members 16, 16 and second jaw members 17, 17 are provided in two sets of grooves 5a and 5b provided in the jaw guide 5 in the radial direction, in such a way that each of the members 16, 16 and 17, 17 can be moved. A first locking recessed portion 16a and a second locking recessed portion 17a are formed in the top surface of each jaw member 16 or 17.

To convert the operations of the first and second rods 9 and 10 into the opening and closing operations of the first and second jaw members 16, 16 and 17, 17, a first lever 18 and a second lever 19 are provided. The first lever 18 is pivotally supported by the pin 14a and has its ends engagingly locked in the locking recessed groove 9a and locking recessed portion 16a, respectively, in such a way as to be oscillatorily moved. In addition, the second lever 19 is pivotally supported by the pin 15a and has its ends engagingly locked in the locking recessed groove 10a and locking recessed portion 17a, respectively, in such a way as to be oscillatorily moved.

FIG. 4 shows that compressed air has been supplied through the ports 11b and 12b. The pistons 7a and 8a have each moved downward and the levers 18 and 19 have each rotationally moved downward, so the first jaw members 16, 16 and the second jaw members 17, 17 are open.

In this state, when compressed air is supplied through the port 11a and ejected through the port 11b, the first piston 7a moves upward to displace the tips of the first levers 18, 18 inward, the interval between the first jaw members 16, 16 decreases to allow them to chuck a workpiece from direction X.

Then, when compressed air is supplied through the port 12a and ejected through the port 12b, the second piston 8a moves upward to displace the tips of the second levers 19, 19 inward, the interval between the second jaw members 17, 17 decreases to allow them to chuck the workpiece from direction Y, which differs from the direction for the first jaw members 16, 16 by 90°.

This configuration enables even an elliptical or a rectangular workpiece to be chucked while positioned.

To avoid the locational interference between the first lever 18 and the second rod 10, however, the proposed fluid pressure chuck allows the tip of the first rod 9 to protrude distinctly from the second rod 10 and the first lever 18 is provided on this protruding portion. This configuration increases the axial length of the fluid pressure chuck 1 to prevent the chuck from being miniaturized. In addition, due to the difference between the first lever 18 and the second lever 19 in shape and size, the structure of the chuck is complicated and the processing and assembly of the parts are cumbersome.

DISCLOSURE OF THE INVENTION

It is an object of this invention to provide a two-drive-system fluid pressure chuck having two sets of jaw members that are individually opened and closed by two sets of cylinder apparatuses and that uses these jaw members to chuck a workpiece from two orthogonal directions, wherein a converting means for converting the operations of rods in the cylinder apparatuses into the opening and closing operations of the jaw members is simplified to simplify the structure of the chuck in order to reduce the overall size.

To achieve this object, a chuck is provided that comprises two sets of closable jaw members; two cylinder apparatuses corresponding to the two sets of jaw members; and a cam means for converting the reciprocal operations of a piston and a rod in each cylinder apparatus into the opening and closing operations of the jaw members.

The two cylinder apparatuses are coaxially disposed, a first rod in the first cylinder apparatus slidably penetrates the inside of a second rod in the second cylinder apparatus, and the tips of the rods are aligned. The cam means consists of a tilted cam-receiving groove formed in each of the jaw members; and a cam member formed at the tip of each of the rods and including a tilted cam that is fitted in the cam receiving groove. A notch is provided in the side of the second rod, and the cam member of the first rod is movably fitted in the notch.

Thus, this invention can align the tips of the two rods in the two cylinder apparatuses and the cam members are formed at the same position as the tips of these rods. This reduces the axial length of the chuck and thus its size, enabling cam means of the same structure to be used to simplify the structures of the chuck and its parts, and facilitating assembly.

According to a specific example of this invention, the pressure-receiving areas of the pistons of the two cylinder apparatuses differ, resulting in a difference in the chucking forces of the two sets of jaw members.

DETAILED DESCRIPTION

Figure 1:
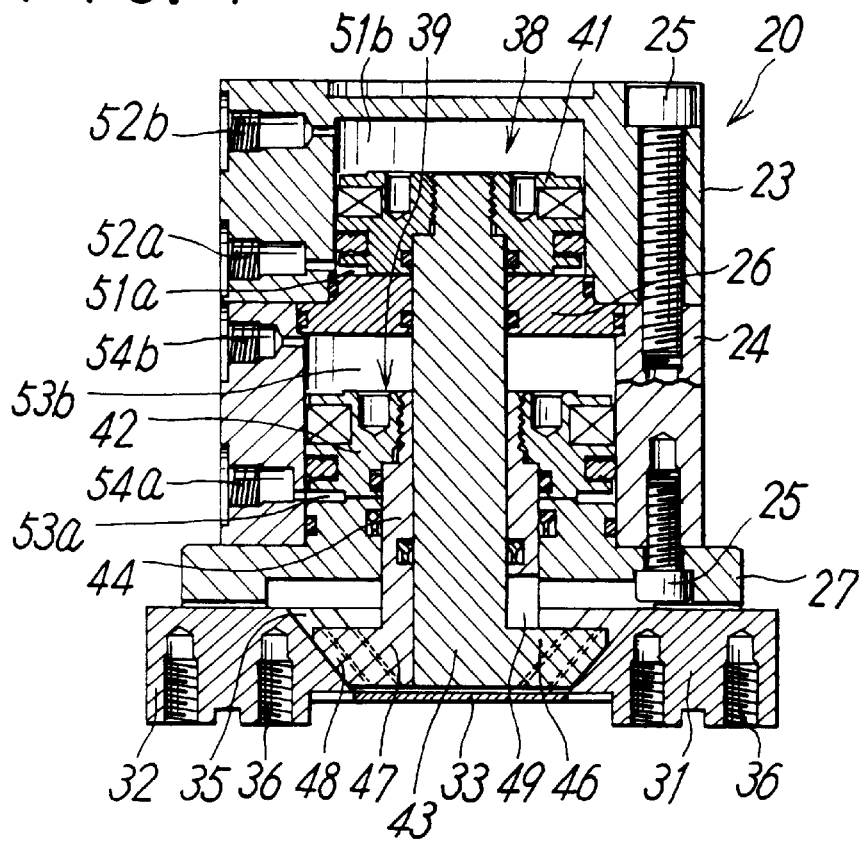
FIG. 1 is a sectional view taken along line I—O—I in FIG. 2, showing one embodiment of a fluid pressure chuck according to this invention.
Figure 2:
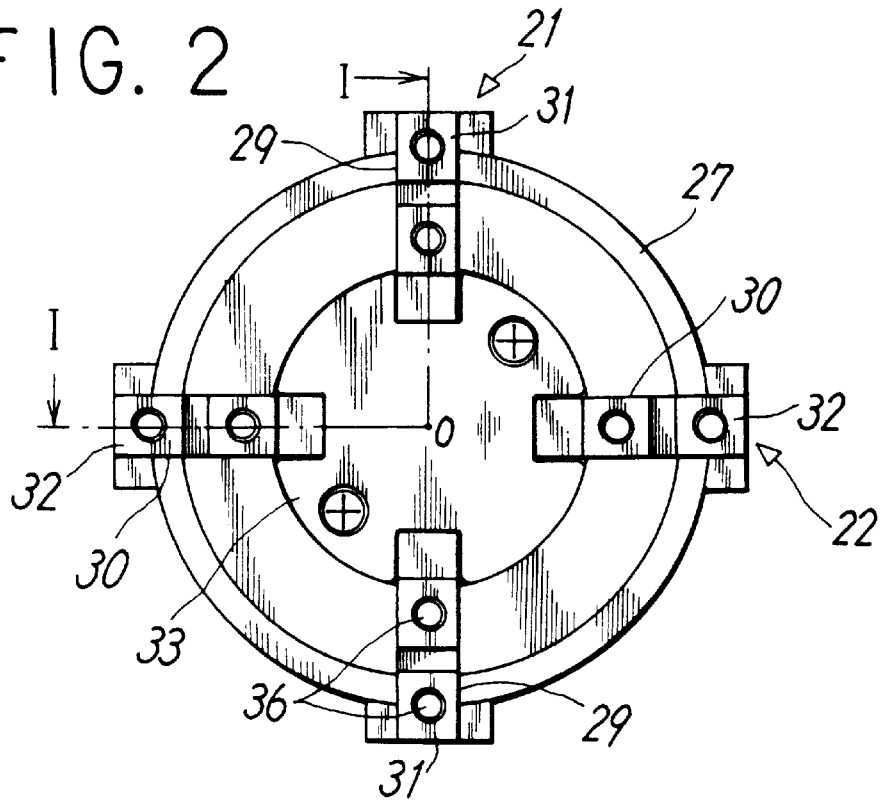
FIG. 2 is a bottom view of FIG. 1.
Figure 3:
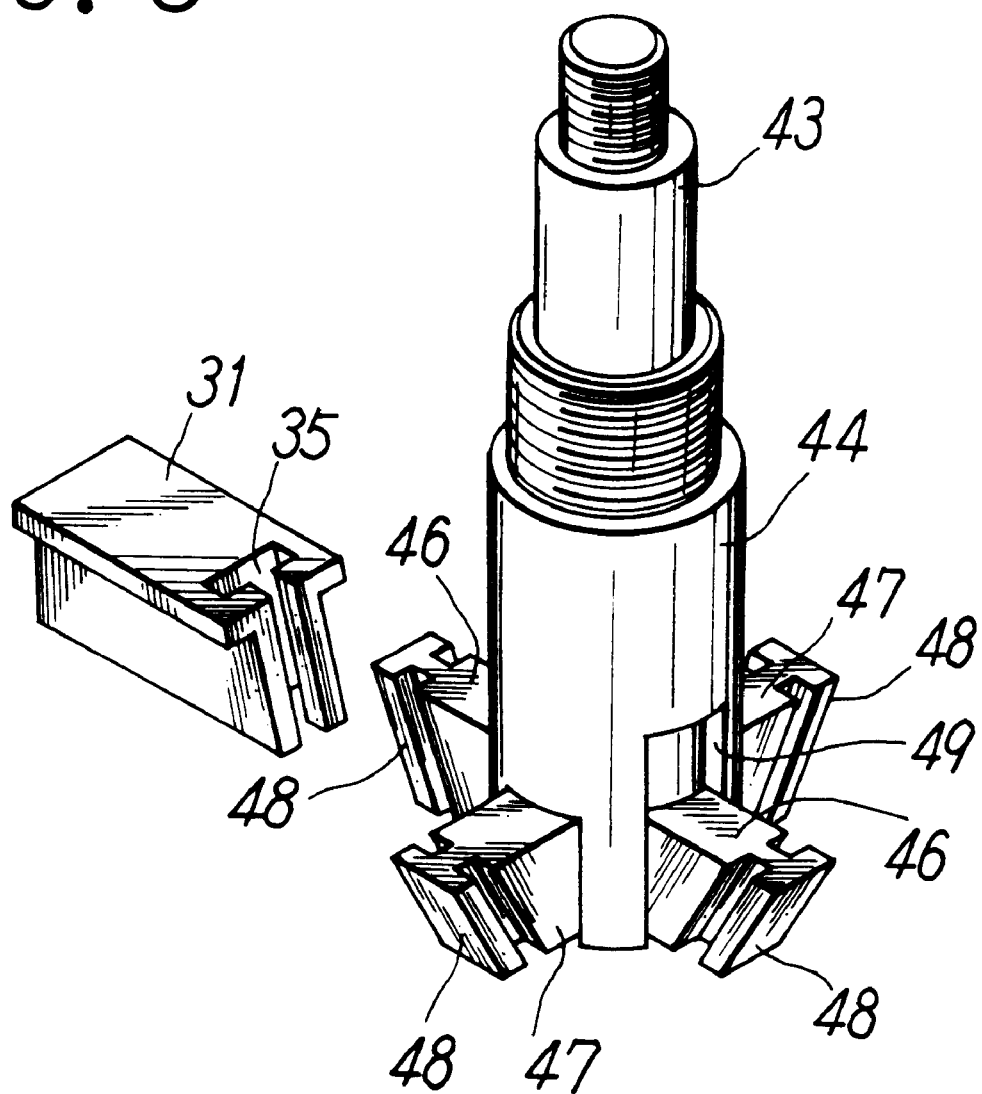
FIG. 3 is an exploded perspective view of the integral part.
Figure 4:
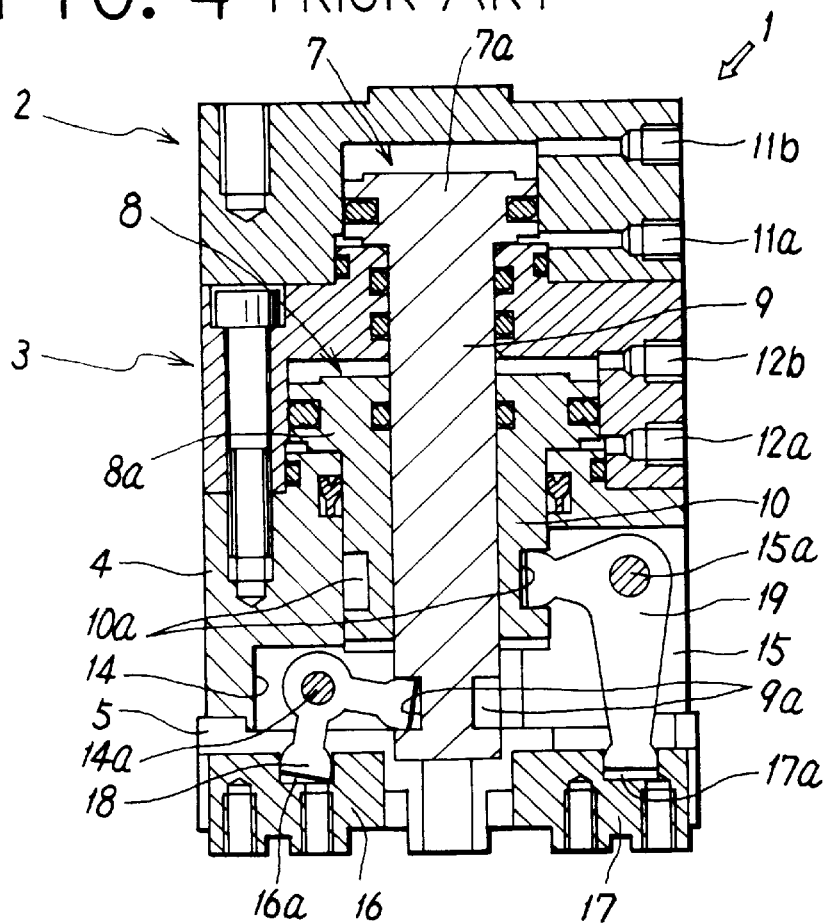
FIG. 4 is a sectional view taken along line IV—O—IV in FIG. 5, showing a well-known fluid pressure chuck.
Figure 5:
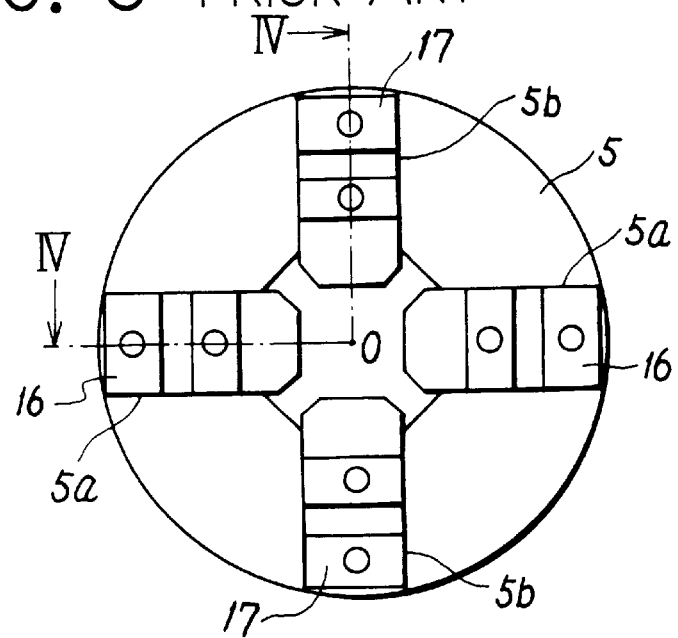
FIG. 5 is a bottom view of FIG. 4.

FIGS. 1 to 3 show one embodiment of a two-drive-system fluid pressure chuck according to this invention. This chuck comprises one body 20 in which two sets of chuck mechanisms, i.e., a first and a second chuck mechanisms 21 and 22 that are individually operated by a fluid pressure can chuck a workpiece from two directions X and Y. The specific configuration of the chuck is described below.

The body 20 comprises a first reverse-cup-shaped body member 23 having inside it a cylinder hole with a smaller diameter; and a second cylindrical body member 24 having inside it a cylinder hole of a larger diameter. The body members 23 and 24 are coaxially connected using a bolt 25 via a partitioning plate 26 that partitions the cylinder holes in an airtight manner. An annular jaw holder 27 also acting as an end plate is mounted at the end of the second body member 24 in an airtight manner.

Two sets of (four) guide grooves 29, 29 and 30, 30 each having an approximately T-shaped cross section are radially formed in the tip surface of the jaw holder 27 at an angular interval of 90° around the center 0 of the chuck. Two sets of (four) jaw members 31, 31 and 32, 32 for chucking a workpiece, each having an approximately T-shaped cross section, are provided in such a way as to be opened and closed along the guide grooves 29 and 30 in the radial direction. The two sets of jaw members 31, 31 and 32, 32 in which the two opposed jaw members constitute one set, can chuck a workpiece from two directions X and Y. In the figure, 33 is a cover that occludes a depressed portion in the tip of the jaw holder 27.

A cam-receiving groove 35 that extends downward (on the side of the axial tip of the chuck) while gradually tilting toward the center of the chuck is formed at the proximal end of each of the jaw members 31 and 32. In addition, a screw hole 36 in which an attachment for chucking a workpiece is mounted is provided in each of the jaw members 31 and 32 in a part closer to its tip.

A first piston 41 of a smaller diameter is slidably inserted into the first body member 23 in an airtight manner, while a second piston 42 of a larger diameter is slidably inserted into the second body member 24 in an airtight manner. Rods 43 and 44 are connected to the pistons 41 and 42, respectively. The first body member 23, the first piston 41, and the first rod 43 form a first cylinder apparatus 38, while the second body member 24, the second piston 42, and the second rod 44 form a second cylinder apparatus 39.

The pressure-receiving areas of the pistons 41 and 42 of the two cylinder apparatuses 38 and 39 may be equal or different. According to the illustrated embodiment, the pressure-receiving area of the first piston 41 is formed to be slightly larger than that of the second piston 42 to set the driving force of the second cylinder apparatus 39 larger than that of the first cylinder apparatus 38, thereby setting the chucking force of the second jaw members 32, 32 to be slightly larger than that of the first jaw members 31, 31.

The first rod 43 of a smaller diameter connected to the first piston 41 of a smaller diameter coaxially and slidably penetrates the inside of the second rod 44 of a larger diameter connected to the second piston 42 of a larger diameter. The tips of the rods 43 and 44 pass through the central hole of the jaw holder 27 to protrude into the depressed portion in the tip surface of the jaw holder 27 which is covered by the cover 33, and are almost aligned.

A pair of cam members 46, 46 or 47, 47 are formed at the tips of the two rods 43 and 44 to extend from the side of each rod in directions that differ by 180°. The cam members convert the reciprocal operations of the pistons 41 and 42 into the opening and closing operations of the jaw members 31, 31 and 32, 32. The two first cam members 46, 46 provided at the tip of the first rod 43 correspond to the first jaw members 31, 31, and the second cam members 47, 47 provided at the tip of the second rod 44 are oriented at 90° from the first cam members 46, 46 and correspond to the second jaw members 32, 32. Tilted cams 48 that extend downward (on the side of the axial tip of the rod) while gradually tilting toward the center of the rod is formed at the tip of each of the cam members 46 and 47. The tilted cams 48 are slidably fitted in the cam-receiving groove 35 in each of the jaw members 31 and 32. When the rods 43 and 44 are extended, the tilted cams 48 of the cam members 46 and 47 push the jaw members 31 and 32 outward to increase the interval between the two jaw members 31, 31 and 32, 32. When the rods 43 and 44 are contracted, the tilted cams 48 pull the jaw members 31 and 32 inward to reduce the interval between them.

The two sets of jaw members 31, 31 and 32, 32 substantially have the same shape and size and are mounted on the jaw holder 27 in such a way as to be located on the same plane. The two sets of cam members 46, 46 and 47, 47 substantially have the same shape and size and are formed at the tips of the two rods 43 and 44, respectively, in such a way as to be located on the same plane. To prevent the second rod 44, which is greater in diameter, from obstructing the arrangement and operation of the cam members 46, 46 provided on the first rod 43, which is smaller in diameter, that penetrates the inside of the second rod 44, two notches 49 are formed at a position of the side of the second rod 44 that is separated from the cam members 46 through 180° and extend from the tip of the second rod 44 in the axial direction. The two cam members 46 of the first rod 43 are movably fitted in the notches 49.

Ports 52a and 52b are provided in the first body member 23 to supply and eject compressed air to and from a pair of pressure chambers 51a and 51b formed on the respective sides of the first piston 41. Ports 54a and 54b are provided in the second body member 24 to supply and eject compressed air to and from a pair of pressure chambers 53a and 53b formed on the respective sides of the second piston 42.

FIG. 1 shows that compressed air is being supplied to the two cylinder apparatuses 38 and 39 through the ports 52b and 54b. Then, since the pistons 41 and 42 and the rods 43 and 44 are each located at a downward moved position as shown in the figure, the first and second jaw members 31, 31 and 32, 32 are each pushed by the cam members 46 and 47 and moved outward to release the workpiece.

To chuck the workpiece, the two chuck members 21 and 22 are driven simultaneously or with small temporal differences. For example, compressed air is supplied through the port 52a to the pressure chamber 51a of the first cylinder apparatus 38 of a smaller pressure receiving area, and the compressed air in the pressure chamber 51b is then ejected through the port 52b to move the first piston 41 and the first rod 43 in the upward direction in FIG. 1 to allow the cam member 46, 46 to pull the first jaw members 31, 31 inward, thereby causing the jaw members to chuck the workpiece from direction Y.

Then, compressed air is supplied through the port 54a to the pressure chamber 53a of the second cylinder apparatus 39 of a larger pressure receiving area, and the compressed air in the pressure chamber 53b is then ejected through the port 54b to move the second piston 42 and the second rod 44 in the upward direction to allow the cam member 47, 47 to pull the second jaw members 32, 32 inward, thereby causing the jaw members to chuck the workpiece from direction X. At this point, if the workpiece chucked by the first jaw members 31, 31 is offset in direction X, the second jaw members 32, 32 having a larger chucking force chucks the workpiece while correcting the offset. Thus, the workpiece is chucked while being positioned accurately in both directions X and Y.

Thus, not only circle- or square-shaped workpiece having an equal length in directions X and Y but also elliptical or rectangular workpiece or other workpieces of an unspecified shape having different lengths in directions x and Y can be chucked while being positioned accurately from two orthogonal directions.

Even if the driving forces of the two cylinder apparatuses 38 and 39 are equal, the workpiece can be of course chucked from two orthogonal directions while its offset is being corrected.

In addition, since the notch 49 is formed in the second rod 44 of a larger diameter and the cam member 46 of the first rod 43 of a smaller diameter is movably fitted in the notch 49, the cam members 46 and 47 of the two rods 43 and 44 can be located so as to have the same height and operating range, thereby allowing the axial length of the chuck and thus its size to be reduced, compared to conventional chucks that open and close jaw members by oscillating levers. In addition, even if the two cylinder apparatuses 38 and 39 are individually driven, the second rod 44 does not obstruct the operation of the cam member 46 of the first rod 43.

What is claimed is:

1. A two-drive-system fluid pressure chuck comprising:
   two sets of jaw members that can chuck a workpiece from two orthogonal directions and that can be opened and closed in a radial direction;
   two cylinder apparatuses including a first cylinder apparatus and a second cylinder apparatus provided so as to correspond to the two sets of jaw members; and
   a cam arrangement configured to convert reciprocal operations of a piston and a rod in each cylinder apparatus into the opening and closing operations of said jaw members, wherein:
   said two cylinder apparatuses are coaxially disposed, a first rod in the first cylinder apparatus slidably penetrating an inside of a second rod in the second cylinder apparatus, said first rod and said second rod each having a tip aligned at a center of an arrangement of said jaw members,
   said cam arrangement includes a tilted cam-receiving groove formed in each of said jaw members and a cam member formed on a side of the tip of each of said rods to extend toward each jaw member, said cam member having a tilted cam that is fitted in said cam-receiving groove, and
   the side of said second rod has a notch provided thereon in such a way that the cam member of said first rod is movably fitted in the notch.

2. A fluid pressure chuck according to claim 1 wherein the pistons in the two cylinder apparatuses have different pressure receiving areas so that the two sets of jaw members have different chucking forces.

3. A chuck comprising:
   a first piston cylinder apparatus including a first rod having an end with a protruding cam member thereon;
   a second piston cylinder apparatus coaxially disposed along an axis with said first piston cylinder apparatus and including a second rod having an end with a protruding cam member thereon, said first rod being slidably received within said second rod;
   a fluid pressure system configured to independently actuate said first piston cylinder apparatus and said second piston cylinder apparatus;
   a first set of opposing jaw members being actuatable along a first radial line extending from said axis, said first set of jaw members having an inclined cam groove that slidably receives said protruding cam member of said first rod whereby said first set of jaw members are actuatable by axial movement of said first rod; and
   a second set of opposing jaw members being actuatable along a second radial line extending from said axis, said second radial line being generally orthogonal to said first radial line, said second set of jaw members having an inclined cam groove that slidably receives said protruding cam member of said second rod whereby said second set of jaw members are actuatable by axial movement of said second rod, wherein a notch is provided in a side of said second rod in such a way that said protruding cam member of said first rod is movably received within said notch thereby preventing interference between said first rod and said second rod during actuation thereof.

4. A chuck according to claim 3 wherein:
   said first piston cylinder apparatus has a cylinder with a first area; and
   said second piston cylinder apparatus has a cylinder with a second area, said first area and said second area being of differing sizes to thereby provide for said first set of jaw members having a different chucking force than said second set of jaw members.

\* \* \* \* \*